United States Patent [19]

Morita et al.

[11] Patent Number: 4,549,607
[45] Date of Patent: Oct. 29, 1985

[54] MICELLAR SLUG FOR OIL RECOVERY

[75] Inventors: Hiroshi Morita, Chiba; Yasuyuki Kawada, Funabashi; Junichi Yamada, Narashino; Toshiyuki Ukigai, Chiba, all of Japan

[73] Assignee: Lion Corporation, Tokyo, Japan

[21] Appl. No.: 514,788

[22] Filed: Jul. 18, 1983

[30] Foreign Application Priority Data

Jul. 19, 1982 [JP] Japan ................................ 57-124498

[51] Int. Cl.⁴ ............................................ E21B 43/16
[52] U.S. Cl. ..................................... 166/274; 166/275; 252/8.55 D; 252/555
[58] Field of Search .......................... 252/8.55 D, 555; 166/274, 275

[56] References Cited

U.S. PATENT DOCUMENTS 3,477,511 11/1969 Jones et al. ......................... 166/275
4,393,937 7/1983 Dilgren et al. ................. 252/8.55 D

FOREIGN PATENT DOCUMENTS 1026666 2/1978 Canada ................................ 166/274

Primary Examiner—Paul Lieberman
Assistant Examiner—Willie Thompson
Attorney, Agent, or Firm—Armstrong, Nikaido, Marmelstein & Kubovcik

[57] ABSTRACT

A micellar slug for use in the recovery of oil, the slug containing a hydrocarbon, an aqueous medium, a surfactant, and a cosurfactant. The surfactant contains as an essential component (a) an internal olefin sulfonate or sulfonates having 10 to 30 carbon atoms and (b) an alpha-olefin sulfonate or sulfonates having 10 to 30 carbon atoms. This micellar slug has a sufficiently low interfacial tension, good salinity tolerance, hard-water resistance, ability to maintain the micro-emulsion against change in the composition of the micro-emulsion, and mobility controlled viscosity.

13 Claims, No Drawings

MICELLAR SLUG FOR OIL RECOVERY

BACKGROUND OF THE INVENTION

1. Field of the Invention

This invention relates to a micellar slug suitable for use in a micellar drive for recovering oil from subterranean reservoirs. More specifically, it relates to a mobility controlled micellar slug for oil recovery having a high capability for maintaining micro-emulsions against the change of the composition of the micro-emulsion, since micro-emulsions can be formed at a high salt concentration and in a wide composition range. This invention also relates to a process for producing or recovering oil from an oil-bearing subterranean reservoir at a high recovery efficiency.

2. Description of the Prior Art

It is well known in the art that the so-called "primary recovery" methods, including pumping methods, can recover only a portion of the petroleum or crude oil (referred to as "oil" hereinafter) from subterranean reservoirs and that they leave substantial amounts of oil in the subterranean reservoirs.

In order to recover the remaining large amounts of oil from the subterranean reservoirs, various so-called "enhanced oil recovery" (EOR) methods have been proposed.

Of the EOR methods, the recent "micellar drive" methods are to be noted. According to these methods, a micellar slug, that is, a clear micro-emulsion derived from water and oil such as petroleum, petroleum distillates, or fuel oil, is injected under pressure into the subterranean reservoirs for the recovery of oil in the subterranean reservoirs. These EOR methods are disclosed in, for example, U.S. Pat. Nos. 3,506,070, 3,613,786, 3,740,343, 3,983,940, 3,990,515, 4,017,405, and 4,059,154. These prior arts disclose that various kinds of surfactants, including anionic-, nonionic-, and cationic-type surfactants, can be used alone or in any mixture thereof in the formation of the micellar slugs. Examples of such surfactants are petroleum sulfonates, alkylaryl sulfonates, dialkyl sulfosuccinates, alkane sulfonates, polyoxyethylene alkylether sulfates, polyoxyethylene alkylethers, polyoxyethylene alkylphenylethers, polyol fatty acid esters, alkyltrimethyl ammonium salts, and dialkyldimethyl ammonium salts.

The surfactants used in the formation of micellar slugs must be available at a low cost, since a large amount of micellar slugs is used for the recovery of oil from subterranean reservoirs, and the surfactants also must fulfill the above-mentioned requirements. Furthermore, the surfactants used in micellar slugs should have good thermal stability, salinity tolerance, and hard-water resistance because, since numerous oil production wells or oilfields are present in the world, subterranean reservoirs have variety of properties and also a variety of available water, for example, from soft water containing no substantial amount of inorganic salts to brine containing large amounts of inorganic salts and polyvalent metallic ions.

It is known in the art that petroleum sulfonate is an optimum surfactant usable as an injection fluid in a micellar drive. However, a problem exists in that petroleum sulfonate has an unsatisfactory salinity tolerance and hard-water resistance and, therefore, can be applied only in the case of special oilfields. For this reason, various attempts have been made to improve the properties of petroleum sulfonate by using petroleum sulfonate together with other surfactants or water-soluble polymer-thickening agents. However, micellar slugs or surfactants having the desired properties and a satisfactory cost have not been obtained.

The inventors have proposed the use of alpha-olefin sulfonates as a surfactant in micellar slugs which have an excellent capability for decreasing interfacial tensions comparable to or better than those of petroleum sulfonates and have an excellent salinity tolerance and hard-water resistance and a relatively high viscosity. However, problems still exist in that micro-emulsions are readily broken when the micro-emulsions are injected into oil-bearing subterranean reservoirs, since the composition range thereof in which micro-emulsions can be formed is not wide, and that the production of micellar slugs having a low viscosity is not easy.

Furthermore, the viscosity of micellar slugs is important in the practice of the micellar drive methods. That is, an oil recovery efficiency may be increased by mobility control i.e., adjusting the viscosity of micellar slugs to substantially equal or little higher than that of the oil remaining in the subterranean reservoirs. No increase in an oil recovery efficiency cannot be obtained without mobility control.

SUMMARY OF THE INVENTION

The object of the present invention is to provide, for the recovery of oil, a micellar slug having the above-mentioned desired properties of the micellar slug, i.e., a sufficiently low interfacial tension, a good salinity tolerance and hard-water resistance, a capability of maintaining the micro-emulsion against a change in the composition of the micro-emulsion, and a mobility controlled (or controlling) viscosity.

Other objects and advantages of the present invention will be apparent from the following description.

In accordance with the present invention, there is provided a micellar slug, for the recovery of oil, consisting essentially of a hydrocarbon, an aqueous medium, a surfactant, and a cosurfactant, the surfactant containing, as an essential component, (a) at least one internal olefin sulfonate having 10 to 30 carbon atoms and (b) at least one alpha-olefin sulfonate having 10 to 30 carbon atoms.

In accordance with the present invention, there is also provided a process for producing oil from an oil-bearing subterranean reservoir penetrated by a well which comprises the steps of:

(1) injecting into said reservoir through said well the micellar slug consisting essentially of a hydrocarbon, an aqueous medium, a surfactant, and a cosurfactant, said surfactant containing, as an essential component, (a) at least one internal olefin sulfonate having 10 to 30 carbon atoms and (b) at least one alpha-olefin sulfonate having 10 to 30 carbon atoms;

(2) injecting into said reservoir at least one driving fluid; and (3) recovering oil from said reservoir through the production well.

DESCRIPTION OF THE PREFERRED EMBODIMENTS

The micellar slugs desirably used for the recovery of oil are transparent or translucent micro-emulsions containing about 3% to about 90% by weight of a hydrocarbon, about 4% to about 94% by weight of an aqueous medium, about 2% to about 30% by weight of a surfactant containing, as an essential constituent, (a) an internal olefin sulfonate or sulfonates having 10 to 30 carbon atoms and (b) an alpha-olefin sulfonate or sulfonates having 10 to 30 carbon atoms, and about 0.1% to about 20% by weight of a cosurfactant.

The aqueous medium usable in the formation of the micellar slug of the present invention may include soft water, water containing inorganic salts, and brine. For example, rain water, river water, lake water, formation water, oil stratum water, and seawater can be freely used in the formation of the micellar slug of the present invention.

The micellar slugs of the present invention have an excellent salinity tolerance and a resistance against alkali metal salts. Therefore, water or brine having an inorganic concentration of 0% to about 25% by weight, desirably about 0% to about 15% by weight can be used in the formation of the micellar slugs of the present invention. Typical examples of the inorganic salts contained in the water (or brine) are NaCl, KCl, Na$_2$SO$_4$, and K$_2$SO$_4$. For instance, seawater contains about 3.5% by weight of inorganic salts including about 1,600 ppm, in terms of a Mg ion, of divalent metal ions. This salt concentration is within the desirable salt concentration range of the present invention.

The internal olefin sulfonates usable as a one component of the surfactant (component (a)) in the present invention are those obtained by sulfonating internal olefins containing as an essential constituent vinylene-type monoolefin having 10 to 30 carbon atoms, desirably 12 to 26 carbon atoms and having a general formula:

$$R-CH=CH-R'$$

wherein R and R' are independently straight- or branched-chain saturated hydrocarbon radicals having 1 or more carbon atoms, desirably 2 to 12, provided that the total carbon atom numbers of R and R' is 8 to 28, desirably 10 to 24, and optionally containing about 33% by weight (about one third of the olefins) or less of tri-substituted type monoolefins, followed by neutralizing the sulfonated products with appropriate bases and, then, optionally, hydrolyzing the neutralized products. The internal olefin sulfonates thus prepared generally contain about 20% to about 60% by weight of alkenyl sulfonates having a double bond and about 80% to about 40% by weight of hydroxyalkane sulfonates and also contain about 80% by weight or more of monosulfonates and about 20% by weight or less of disulfonates. It should be noted, however, that internal olefin sulfonates having compositions different from the above-mentioned composition ratios can be prepared by appropriately selecting the sulfonation conditions and hydrolysis conditions. Generally speaking, an increase in the carbon atom number of the internal olefin tends to result in an increase in the composition ratio of the alkenylsulfonate. On the other hand, the increase in the mole ratio of the sulfonating agent to the internal olefin during the sulfonation tends to result in an increase in the composition ratio of the disulfonate.

The internal olefin sulfonates usable in the present invention can be alkali metal salts, alkaline earth metal salts, ammonium salts, and organic amine salts thereof. The desirable counter cations are Na, K, Mg, Ca, NH$_4$, and alkanolammonium, especially, Na and Mg.

Examples of internal olefin sulfonates suitable for use in the formation of the micellar slugs of the present invention are: internal olefin sulfonate having 12, 13, 14, 15, 16, 17, 18, 19, 20. 21, 22, 24, 12 to 16, 13 to 14, 14 to 16, 14 to 18, 15 to 18, 15 to 20, 16 to 18, 16 to 20, 18 to 20, and 20 to 24 carbon atoms, and any mixture thereof. The internal olefin sulfonates in the form of mixtures of those having various carbon numbers can be desirably used in the present invention from the viewpoints of their availability and the performances of the micellar slugs obtained therefrom.

The alpha-olefin sulfonates usable as the other component (component (b)) of the surfactant in the present invention are those having 10 to 30 carbon atoms, desirably 12 to 26 carbon atoms and more desirably, 13 to 24 carbon atoms.

The alpha-olefin sulfonates usable in the present invention can be alkali metal salts, alkaline earth metal salts, ammonium salts, and organic amine salts thereof. The desirable counter cations are Na, K, Mg, Ca, NH$_4$, and alkanolammonium.

Examples of alpha-olefin sulfonates usable in the formation of the micellar slugs of the present invention are 1-dodecene sulfonate, 1-tetradecene sulfonate, 1-hexadecene sulfonate, 1-octadecene sulfonate, 1-eicosane sulfonate, 1-dococene sulfonate, 1-tetracocene sulfonate, alpha-olefin sulfonates having 10 to 14 carbon atoms, alpha-olefin sulfonates having 14 to 16 carbon atoms, alpha-olefin sulfonates having 14 to 18 carbon atoms, alpha-olefin sulfonates having 15 to 18 carbon atoms, alpha-olefin sulfonates having 16 to 18 carbon atoms, and alpha-olefin sulfonates having 20 to 24 carbon atoms. These sulfonates may be used alone or in any mixture thereof. The sodium salts are readily available at a low cost. The alkaline earth metal salts, desirably the Mg salts exhibit excellent hard-water resistance.

According to the present invention, the internal olefin sulfonates and the alpha-olefin sulfonates are used as a surfactant component in micellar slugs. The ratio by weight of the internal olefin sulfonates and the alpha-olefin sulfonates used in the present invention is suitably selected depending upon the properties of oilfields and subterranean reservoirs, water (or brine) used, and co-surfactants used. The desirable weight ratio of the internal olefin sulfonates to the alpha-olefin sulfonates is 95/5 to 10/90, more desirably 90/10 to 20/80. It is difficult to find a desired composition capable of forming micro-emulsions under conditions for both production of micellar slugs on the ground and in the subterranean reservoirs, since the composition range capable of forming the micro-emulsions is narrow when the alpha-olefin sulfonates are used alone as a surfactant component. On the other hand, when the internal olefin sulfonates are used as a surfactant component, the production of micellar slugs having a high viscosity is difficult, so that the use of a thickening agent is required in many cases to effect a mobility control in conformity with the conditions of oilfields. However, the use of a thickening agent increases the production cost of a micellar slug to decrease the economic value and also adversely affect the micro-emulsion forming region of the micellar slug. As a result, there are many cases where a thickening agent cannot be used. Contrary to this, the above-mentioned disadvantages can be solved by the combined use of the internal olefin sulfonates and the alpha-olefin sulfonates.

As a result, micellar slugs suitable for use in various oilfields having different properties can be readily prepared.

As mentioned above, the micellar slugs of the present invention contain about 2% to about 30% by weight of the surfactant. However, the micellar slugs desirably contain about 4% to about 25% by weight of the surfactant, taking into consideration both low interfacial tensions and reasonable cost. The total amount of the internal olefin sulfonates having 10 to 30 carbon atoms and the alpha-olefin sulfonates having 10 to 30 carbon atoms should be at least 80% by weight desirably 90% by weight or more, based on the total amount of the surfactants contained in the micellar slugs.

The hydrocarbons usable as an oil component in the present invention include, for example, petroleum, liquefied petroleum gas, crude gasoline (naphtha), kerosine, diesel oil, and fuel oil. The recovered petroleum is desirably used due to its low cost and availability as well as its composition, which is similar to that of the oil contained in subterranean reservoirs. Furthermore, the internal olefin sulfonates and the alpha-olefin sulfonates generally contain hydrocarbons such as unreacted olefins or polymerized products and, therefore, these hydrocarbons can be considered an oil phase component.

As mentioned above, the micellar slugs of the present invention can contain about 3% to about 90% by weight of hydrocarbons. The desirable concentration of hydrocarbons is within the range of about 5% to about 40% by weight whereby an oil-in-water (O/W) type emulsion is formed, since the use of a large amount of hydrocarbons is not economical.

The cosurfactants used in the formation of the micellar slugs of the present invention are an essential constituent for forming micro-emulsions associated with the surfactants. The cosurfactants usable in the present invention are those having an alcoholic hydroxyl group. The desirable cosurfactants are alcohols having the general formula:

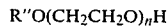

$$R''O(CH_2CH_2O)_nH$$

wherein n is a number of from 0 to about 4 and R'' is an alkyl or alkenyl group having 3 to 8 carbon atoms when n is zero and an alkyl or alkenyl group having 1 to 18 carbon atoms, a phenyl group, or an alkylphenyl group having 7 to 18 carbon atoms when n is not zero. The aliphatic groups of R'' may be straight-chain or branched-chain groups.

Examples of such alcohols are propanols, butanols, pentanols, hexanols, 2-ethylhexanol or other octanols, polyoxyethylene hexylethers ($\bar{n}=1$), polyoxyethylene decylethers ($\bar{n}=2$), polyoxyethylene tridecylethers ($\bar{n}=4$), polyoxyethylene butylphenylethers ($\bar{n}=2$) polyoxyethylene nonylphenylethers ($\bar{n}=3$), polyoxyethylene dodecylphenylethers ($\bar{n}=4$), butoxyethanols, and diethyleneglycol monobutylethers.

As mentioned above, the micellar slugs of the present invention can contain about 0.1% to about 20% by weight of the cosurfactants. However, the desirable concentration of the cosurfactants is within the range of about 1% to about 15% by weight from the viewpoints of the stability of the micro-emulsions and the decreasing capacity for the interfacial tensions.

The micellar slugs of the present invention contain, as essential components, the internal olefin sulfonates and the alpha-olefin sulfonates and, therefore, have high applicability or flexibility to various oilfields having different properties and to different properties of subterranean reservoirs. That is, since the micellar slugs of the present invention have excellent hard-water resistance and salinity tolerance, wide composition range capable of forming micro-emulsions, and good range capable of forming micro-emulsions, and good heat stability, the micellar slugs which have excellent capability of maintaining micro-emulsions and which is mobility controlled in accordance with viscosities of oils present in subterranean reservoirs, can be readily and advantageously obtained by changing the ratio of the internal olefin sulfonates and the alpha-olefin sulfonates used.

The micellar slugs of the present invention can include, in addition to the above-mentioned essential constituents, other auxiliary surfactants and thickening agents or viscosity adjusting agents, as long as the effects of the present invention are not impaired.

Examples of such auxiliary surfactants are anionic surfactants and nonionic surfactants such as petroleum sulfonates, alkylbenzene sulfonates, polyoxyethylene alkylether sulfates, dialkyl sulfosuccinates, alpha-olefin sulfonates, paraffin sulfonates, soaps, higher alcohol ethoxylates, alkyphenol ethoxylates, polyol fatty acid esters, fatty acid alkylol amides, and polyoxyethylene fatty acid amides. Examples of thickening agents usable in the present invention are water-soluble inorganic salts, heteropolysaccharides produced by microorganisms, naphthalenesulfonic acidformaldehyde condensates, polyacrylamides, polyacrylates, hydroxyethylcelluloses, and carboxymethylcelluloses.

The micellar slugs of the present invention can be readily obtained by any known method of production. For example, the hydrocarbons, the surfactants, the aqueous medium, and the cosurfactants can be mixed in any mixing order by using conventional mixing devices, mixing temperatures, and mixing pressures.

The recovery of oil from subterranean reservoirs can be carried out by means of any conventional micellar drive method by using the micellar slugs of the present invention. For instance, the micellar slugs are injected at a temperature of 5° C. to 90° C. under pressure (e.g., 1 to 350 kg/cm$^2$) into at least one injection well of the subterranean reservoirs. Then, at least one driving fluid such as flood water and/or aqueous solution of the above-mentioned thickening agent is injected into the injection well at a temperature of 5° C. to 90° C. under pressure (e.g., 1 to 350 kg/cm$^2$) so as to transfer or drive the remaining oil toward an oil production well and to recover the oil from the production well. The suitable amount of the micellar slugs injected into the injection well is at least about 3%, desirably about 5% to about 20% by volume of the porosity of the subterranean reservoirs.

EXAMPLES

The present invention now will be further illustrated by, but is by no means limited to, the following examples, in which the component ratios or amounts of samples used are based on "% by weight" unless otherwise specified.

EXAMPLE 1

This example illustrates that micro-emulsions (i.e., micellar slugs) can be formed by the combined use of the internal olefin sulfonates ("IOS" hereinbelow) and the alpha-olefin sulfonates ("AOS" hereinbelow) in compositions in which micro-emulsions cannot be formed by the use of AOS alone.

Samples were prepared by mixing water with the surfactants, followed by the mixing with the cosurfactants and the hydrocarbons, while stirring. The compositions and the properties of the samples thus obtained are shown in Table 1, in which "C$_{14}$–C$_{18}$ IOS Na" and "$C_{14}$-$C_{18}$ AOS Na" represent sodium salts of internal olefin sulfonates having 14 to 18 carbon atoms and sodium salts of alpha-olefin sulfonates having 14 to 18 carbon atoms, respectively.

The micro-emulsion forming capabilities (i.e., visual appearance), the interfacial tension, and the viscosities thus prepared were evaluated as follows. The results are shown in Table 1.

Micro-emulsion forming capabilities were determined from the visual appearances of the micro-emulsions according to the following:
o ... a transparent or translucent and homogeneous micro-emulsion was formed
x ... An opaque suspension rather than a micro-emulsion was formed.

The interfacial tensions were measured by a spinning drop type tensiometer at 25° C. in an appropriately diluted system.

The viscosities were measured at 25° C. by a Brookfield viscometer.

In the Table 1, sample No. 2 is a reference example in which a micro-emulsion can be formed by the use of AOS alone. Sample Nos., 4, 6, 8, and 10 are comparative examples showing that micro-emulsions cannot be formed by the use of AOS alone. Sample Nos. 1, 3, 5, 7, and 9 are examples according to the present invention.

TABLE 1

| Sample No. | 1 | 2*1 | 3 | 4*2 | 5 | 6*2 | 7 | 8*2 | 9 | 10*2 |
|---|---|---|---|---|---|---|---|---|---|---|
| Surfactant | | | | | | | | | | |
| $C_{14}$-$C_{18}$ IOS Na | 4.2 | — | 4.2 | — | 4.2 | — | 3.15 | — | 3.15 | — |
| $C_{14}$-$C_{18}$ AOS Na | 9.8 | 14 | 9.8 | 14 | 9.8 | 14 | 7.35 | 10.5 | 7.35 | 10.5 |
| Cosurfactant | 6 | 6 | 6 | 6 | 6 | 6 | 4.5 | 4.5 | 4.5 | 4.5 |
| n-Amyl alcohol | | | | | | | | | | |
| Hydrocarbon | 10 | 10 | 30 | 30 | 50 | 50 | 40 | 40 | 60 | 60 |
| Fuel oil | | | | | | | | | | |
| Water | 70 | 70 | 50 | 50 | 30 | 30 | 45 | 45 | 25 | 25 |
| Brine (NaCl 2%) | | | | | | | | | | |
| Properties | | | | | | | | | | |
| Visual appearance | o | o | o | x | o | x | o | x | o | x |
| Interfacial tension (× $10^{-3}$ dyne/cm) | 15.4 | 23.5 | 5.2 | — | 3.7 | — | 76 | — | 8.3 | — |
| Viscosity (centipoise) | 21 | 27 | 34 | — | 52 | — | 44 | — | 36 | — |

*1 Reference Example
*2 Comparative Example

EXAMPLE 2

This example illustrates that the mobility control can be readily effected by the combined use of IOS and AOS as a surfactant component.

Samples were prepared in the same manner as in Example 1. The compositions and properties of the samples are shown in Table 2 below. Sample No. 11 is a comparative example in which only IOS was used and sample No. 15 exhibits too high a viscosity. The remaining samples in Table 2 are examples according to the present invention.

EXAMPLE 3

The example illustrates samples in which surfactants having different carbon numbers and different counter cations are used.

These samples were prepared in the same manner as in Example 1. The compositions and properties of the samples are shown in Table 3(a) and 3(b).

TABLE 2

| Sample No. | 11 | 12 | 13 | 14 | 15* | 16 | 17 | 18 | 19 | 20 | 21 | 22 | 23 |
|---|---|---|---|---|---|---|---|---|---|---|---|---|---|
| Surfactant | | | | | | | | | | | | | |
| $C_{14}$-$C_{18}$ IOS Na | 14 | 11.9 | 7 | 2.1 | 0.7 | 12.6 | 11 | 12.5 | 5 | 3.5 | 8 | 6 | 5 |
| $C_{14}$-$C_{18}$ AOS Na | — | 2.1 | 7 | 11.9 | 13.3 | 1.4 | 3 | 2.5 | 2 | 5.5 | 2 | 4 | 1 |
| Cosurfactant | 6 | 6 | 6 | 6 | 6 | 6 | 6 | 5 | 3 | 1 | 5 | 5 | 4 |
| n-Amyl alcohol | | | | | | | | | | | | | |
| Hydrocarbon | | | | | | | | | | | | | |
| Kerosine | — | — | — | — | — | — | — | — | — | — | 15 | 15 | 10 |
| Fuel oil | 40 | 40 | 40 | 40 | 40 | 50 | 15 | 40 | 10 | 15 | — | — | — |
| Water | | | | | | | | | | | | | |
| Brine (NaCl 2%) | 40 | 40 | 40 | 40 | 40 | 30 | 65 | 40 | 80 | 75 | — | — | — |
| Brine (NaCl 1%, $Mg^{++}$ 4000 ppm) | — | — | — | — | — | — | — | — | — | — | 70 | — | — |
| Brine (NaCl 1%, $Ca^{++}$ 1500 ppm) | — | — | — | — | — | — | — | — | — | — | — | 70 | — |
| Brine (NaCl 1%, $Mg^{++}$ 2000 and $Ca^{++}$ 1000) | — | — | — | — | — | — | — | — | — | — | — | — | 80 |
| Properties | | | | | | | | | | | | | |
| Visual appearance | o | o | o | o | o | o | o | o | o | o | o | o | o |
| Interfacial tension (× $10^{-3}$ dyne/cm) | 0.92 | 0.95 | 0.85 | 0.93 | — | 3.6 | 15.7 | 0.93 | 38.3 | 15.4 | 35.5 | 36.7 | 27.7 |
| Viscosity (centipoise) | 6 | 21 | 106 | 322 | >2000 | 12 | 16 | 38 | 7 | 12 | 11 | 14 | 6 |

*Comparative Example

TABLE 3

| Sample No. | | 24 | 25 | 26 | 27 | 28 | 29 | 30 | 31 | 32 |
|---|---|---|---|---|---|---|---|---|---|---|
| Surfactant A | $C_{14}$-$C_{18}$ IOS Na | 3.5 | — | — | — | — | — | — | — | — |
| | $C_{14}$-$C_{18}$ IOS K | — | 3 | 7 | — | — | — | — | — | — |
| | $C_{14}$-$C_{18}$ IOS $NH_4$ | — | — | — | 3 | — | — | — | — | — |
| | $C_{14}$-$C_{18}$ IOS $NH_2(C_2H_4OH)_2$ | — | — | — | — | 3 | — | — | — | — |
| | $C_{20}$-$C_{24}$ IOS Na | — | — | — | — | — | 5 | 3.5 | 7 | 5 |

TABLE 3-continued

| | | | | | | | | | | |
|---|---|---|---|---|---|---|---|---|---|---|
| Surfactant B | $C_{14}$-$C_{18}$ AOS Na | — | — | — | — | 11 | — | 7 | — | 5 |
| | $C_{14}$-$C_{18}$ AOS K | — | — | 7 | 7 | — | — | — | — | — |
| | $C_{14}$-$C_{18}$ AOS $NH_4$ | — | 7 | — | — | — | — | — | — | — |
| | $C_{20}$-$C_{24}$ AOS Na | 7 | — | — | — | — | 2 | — | 7 | — |
| Cosurfactant | Isopropyl alcohol | — | — | 6 | — | — | 3 | — | 6 | — |
| | n-Amyl alcohol | 4.5 | 5 | — | 5 | 6 | — | 4.5 | — | 5 |
| Hydrocarbon | Kerosine | — | 15 | 40 | — | — | 30 | — | 10 | 20 |
| | Fuel oil | 15 | — | — | 25 | 5 | — | 10 | — | — |
| Water | Brine (NaCl 0.5%) | 70 | — | — | — | 75 | 60 | — | — | — |
| | Brine (NaCl 2%) | — | 70 | — | — | — | — | 75 | — | — |
| | Brine (NaCl 5%) | — | — | — | — | — | — | — | 70 | — |
| | Brine (NaCl 8%) | — | — | 40 | 60 | — | — | — | — | 65 |
| Properties | Visual appearance | o | o | o | o | o | o | o | o | o |
| | Interfacial tension ($\times 10^{-3}$ dyne/cm) | 2.6 | 38.4 | 5.8 | 21.7 | 57.2 | 3.9 | 18.4 | 47.3 | 3.1 |
| | Viscosity (centipoise) | 19 | 9 | 78 | 21 | 3 | 48 | 17 | 40 | 13 |

| | Sample No. | 33 | 34 | 35 | 36 | 37 | 38 |
|---|---|---|---|---|---|---|---|
| Surfactant A | $C_{12}$-$C_{14}$ IOS Na | 6 | — | — | — | — | — |
| | $C_{12}$-$C_{14}$ IOS Mg | — | 5.2 | — | — | — | 3 |
| | $C_{12}$-$C_{14}$ IOS Ca | — | — | 7 | — | — | — |
| | $C_{20}$-$C_{24}$ IOS Na | — | — | — | 6.5 | — | — |
| | $C_{20}$-$C_{24}$ IOS Mg | — | — | — | — | 3 | 3 |
| Surfactant B | $C_{12}$-$C_{14}$ Mg | 4 | 5.3 | — | — | — | — |
| | $C_{12}$-$C_{14}$ Ca | — | — | 7 | — | — | — |
| | $C_{20}$-$C_{24}$ Na | — | — | — | 4 | — | — |
| | $C_{20}$-$C_{24}$ Mg | — | — | — | — | 3 | 4 |
| Cosurfactant | n-Amyl alcohol | 5 | 4.5 | 6 | 4.5 | 4 | 5 |
| Hydrocarbon | Kerosine | — | — | — | 17 | — | — |
| | Fuel oil | 10 | 5 | 30 | — | 40 | 20 |
| Water | Brine (NaCl 0.5%) | — | — | — | — | 50 | 65 |
| | Brine (NaCl 2%) | — | — | 50 | — | — | — |
| | Brine (NaCl 5%) | — | 80 | — | — | — | — |
| | Brine (NaCl 8%) | 75 | — | — | — | — | — |
| | Brine (NaCl 1%, $Mg^{++}$ 500 PPM) | — | — | — | 68 | — | — |
| Properties | Visual appearance | o | o | o | o | o | o |
| | Interfacial tension ($\times 10^{-3}$ dyne/cm) | 53.3 | 23.4 | 43.7 | 0.8 | 4.7 | 1.7 |
| | Viscosity (centipoise) | 8 | 12 | 43 | 13 | 43 | 21 |

We claim:

1. A micellar slug for use in the recovery of oil, said slug consisting essentially of a hydrocarbon, an aqueous medium, a surfactant, and a cosurfactant, said surfactant containing, as an essential component, (a) at least one internal olefin sulfonate having 10 to 30 carbon atoms and (b) at least one alpha-olefin sulfonate having 10 to 30 carbon atoms wherein the ratio of (a)/(b)=95/5 to 10/90.

2. A micellar slug as claimed in claim 1, wherein said internal olefin sulfonates contain about 40% to about 80% by weight of hydroxyalkane sulfonates and about 20% to about 60% by weight of alkenyl sulfonates.

3. A micellar slug as claimed in claim 1, wherein the content of disulfonates in the internal olefin sulfonates is about 20% by weight or less.

4. A micellar slug as claimed in claim 1, wherein said surfactant is internal olefin sulfonates having 12 to 26 carbon atoms.

5. A micellar slug as claimed in claim 1, wherein said micellar slug consists essentially of about 3% to about 90% by weight of the hydrocarbon, about 4% to about 94% by weight of the aqueous medium, about 2% to about 30% by weight of the surfactant, and about 0.1% to about 20% by weight of the cosurfactant.

6. A micellar slug as claimed in claim 1, wherein said surfactant is an alpha-olefin sulfonate having 12 to 26 carbon atoms.

7. A micellar slug as claimed in claim 1, wherein said cosurfactant has the general formula:

$$R'O(CH_2CH_2O)_nH$$

wherein n is a number of from 0 to about 4 and R" is an alkyl or alkenyl group having 3 to 8 carbon atoms when n is zero and an alkyl or alkenyl group having 4 to 18 carbon atoms, a phenyl group, or an alkylphenyl group having 7 to 18 carbon atoms when n is not zero.

8. A process for producing oil from an oil-bearing subterranean reservoir penetrated by a well which comprises the steps of:

(1) injecting into said reservoir through said well a micellar slug consisting essentially of a hydrocarbon, an aqueous medium, a surfactant, and a cosurfactant, said surfactant containing, as an essential component, (a) at least one internal olefin sulfonate having 10 to 30 carbon atoms and (b) at least one alpha-olefin sulfonate having 10 to 30 carbon atoms;

(2) injecting into said reservoir at least one driving fluid; and (3) recovering oil from said reservoir through the production well.

9. A process as claimed in claim 8, wherein said internal olefin sulfonates contain about 40% to about 80% by weight of hydroxyalkane sulfonates and about 20% to about 60% by weight of alkenyl sulfonates 10. A process as claimed in claim 8, wherein the content of disulfonates in the internal olefin sulfonates is about 20% by weight or less.

11. A process as claimed in claim 8, wherein said micellar slug consists essentially of about 3% to about 90% by weight of the hydrocarbon, about 4% to about 94% by weight of the aqueous medium, about 2% to about 30% by weight of the surfactant, and about 0.1% to about 20% by weight of the cosurfactant.

12. A process as claimed in claim 8, wherein said surfactant contains (a) the internal olefin sulfonate and (b) the alpha-olefin sulfonate in a weight ratio of (a)/(b)=95/5 to 10/90.

13. A process as claimed in claim 8, wherein said cosurfactant has the general formula:

R″O(CH₂CH₂O)ₙH wherein n is a number of from 0 to about 4 and R″ is an alkyl or alkenyl group having 3 to 8 carbon atoms when n is zero and an alkyl or alkenyl group having 4 to 18 carbon atoms, a phenyl group, or an alkylphenyl group having 7 to 18 carbon atoms when n is not zero.

* * * * *